US010465911B2

(12) United States Patent
Sander et al.

(10) Patent No.: US 10,465,911 B2
(45) Date of Patent: Nov. 5, 2019

(54) HEAT SHIELD WITH AXIAL RETENTION

(71) Applicant: UNITED TECHNOLOGIES CORPORATION, Formington, CT (US)

(72) Inventors: David J. Sander, South Windsor, CT (US); Jonathan Lemoine, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 315 days.

(21) Appl. No.: 15/156,927

(22) Filed: May 17, 2016

(65) Prior Publication Data

US 2017/0336074 A1 Nov. 23, 2017

(51) Int. Cl.
*F23R 3/60* (2006.01)
*F02C 7/20* (2006.01)
(Continued)

(52) U.S. Cl.
CPC .............. *F23R 3/60* (2013.01); *F01D 11/005* (2013.01); *F01D 25/145* (2013.01); *F01D 25/243* (2013.01); *F23R 3/002* (2013.01); *F02C 7/20* (2013.01); *F05D 2230/642* (2013.01); *F05D 2240/15* (2013.01); *F05D 2260/231* (2013.01);
(Continued)

(58) Field of Classification Search
CPC ...... F01D 11/005; F01D 25/246; F01D 9/023; F01D 9/041; F01D 25/18; F01D 25/145; F01D 11/003; F01D 25/243; F05D 2240/55; F05D 2260/98; F05D 2220/32; F05D 2240/15; F05D 2260/231; F05D 2240/58; F05D 2240/70; F05D 2240/90; F05D 2260/30; F05D 2230/64; F05D 2230/642; F05D 2240/14; F05D 2240/35; F16J 15/062; F16J 15/0887; F23R 3/002; F23R 3/42; F23R 3/60; F23R 2900/00017; B05B 15/65; B05B 15/60; B05B 15/065;
(Continued)

(56) References Cited

U.S. PATENT DOCUMENTS 4,379,560 A 4/1983 Bakken
7,174,719 B2 * 2/2007 Kim .................... F01D 11/003
415/174.3
(Continued)

FOREIGN PATENT DOCUMENTS

JP H06129207 5/1994
WO 2010051110 5/2010
WO 2013165868 11/2013

OTHER PUBLICATIONS

EP Extended Search report dated Aug. 1, 2017 in EP Application No. 17171404.1.

*Primary Examiner* — Gerald L Sung
*Assistant Examiner* — Jacek Lisowski
(74) *Attorney, Agent, or Firm* — Snell & Wilmer, L.L.P.

(57) ABSTRACT

A heat shield assembly for an engine case of a gas turbine engine may include a heat shield having an annular shape. A first groove may be formed circumferentially along an inner surface of the heat shield. A support lock may have a second groove extending radially inward from a distal surface of the support lock. A retention ring may be configured to fit within the first groove of the heat shield and the second groove of the support lock.

18 Claims, 9 Drawing Sheets

(51) Int. Cl.
  *F23R 3/00*    (2006.01)
  *F01D 11/00*   (2006.01)
  *F01D 25/14*   (2006.01)
  *F01D 25/24*   (2006.01)

(52) U.S. Cl.
  CPC ......... *F05D 2260/31* (2013.01); *Y02T 50/675* (2013.01)

(58) Field of Classification Search
  CPC .. B05B 1/14; F16N 7/34; F16N 21/04; F01M 1/08; F02C 7/20; F02C 7/24; F16L 57/04
  USPC ................................................ 60/39.08, 752
  See application file for complete search history.

(56) References Cited

U.S. PATENT DOCUMENTS

| | | | |
|---|---|---|---|
| 2006/0123797 A1 | 6/2006 | Zborovsky | |
| 2014/0072418 A1* | 3/2014 | Casavant | F16J 15/3288 415/182.1 |
| 2015/0132054 A1* | 5/2015 | Dreischarf | F01D 25/24 403/376 |
| 2017/0276355 A1* | 9/2017 | Sander | F01D 9/023 |
| 2017/0292702 A1* | 10/2017 | Sander | F23R 3/002 |
| 2017/0292704 A1* | 10/2017 | Sander | F23R 3/10 |
| 2018/0306120 A1* | 10/2018 | Shi | F01D 9/023 |

* cited by examiner

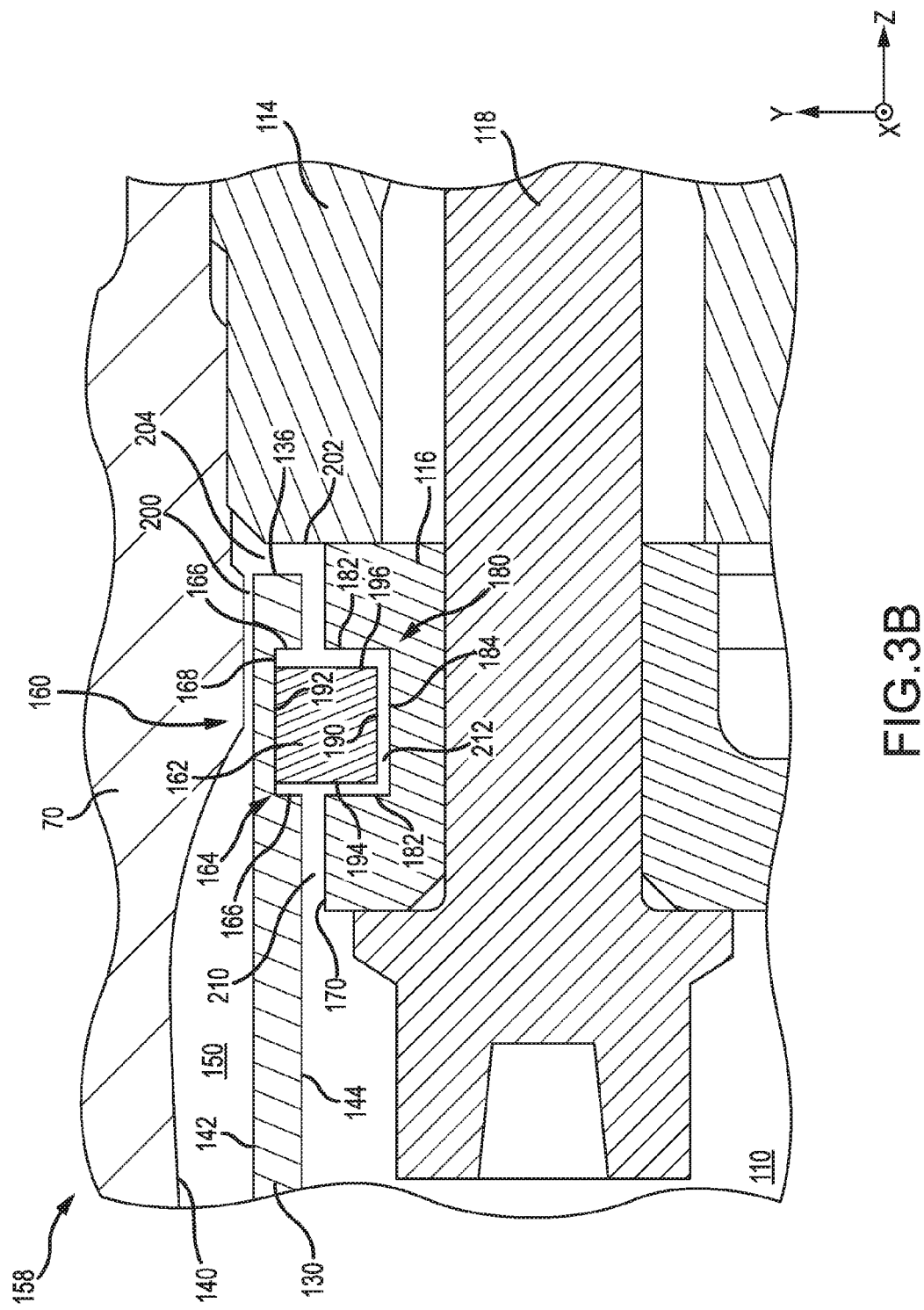

HEAT SHIELD WITH AXIAL RETENTION

FIELD

The present disclosure relates to gas turbine engines, and, more specifically, to a combustor section and engine case.

BACKGROUND

A gas turbine engine typically includes a fan section, a compressor section, a combustor section, and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

The combustor is typically coupled to an engine case of the gas turbine engine. The engine case may include a diffuser case, which circumscribes the compressor section. The diffuser case and fittings may be subjected to relatively high temperatures due to heat convectively transferred from the combustor to the diffuser case. Thermal loads in the diffuser case may cause thermal gradients that may stress, deform, fracture, and/or degrade portions of the diffuser case over time. A flange of the diffuser case may experience thermal gradients of 500° F. (260° C.) to 600° F. (315° C.). The thermal gradients cause stress that may shorten the operational life of engine case components. During operation, the thermal load on an engine case may increase the overall length of the engine case. This thermal growth may contribute to misalignment of engine components and liberation of components. Component liberation may contribute to loss of performance and/or efficiency of the gas turbine engine and/or degradation of components within the gas turbine.

SUMMARY

A heat shield assembly for an engine case of a gas turbine engine is described herein, in accordance with various embodiments. The heat shield assembly may include a heat shield having an annular shape. A first groove may be formed circumferentially along an inner surface of the heat shield. A support lock may have a second groove extending radially inward from a distal surface of the support lock. A retention ring may be configured to fit within the first groove of the heat shield and the second groove of the support lock.

In various embodiments, the retention ring may be circumferentially discontinuous. The first groove may be disposed at an aft end of the heat shield. An outer surface of the heat shield and an inner surface of the engine case may define a first gap. The inner surface of the heat shield and the distal surface of the support lock may define a second gap. A first thickness of the heat shield at a forward end may be greater than a second thickness of the heat shield at the aft end. The engine case may comprise a diffuser case.

A combustor section of a gas turbine engine is also provided. The combustor section may include a diffuser case and a heat shield assembly disposed within the diffuser case. The heat shield assembly may include a heat shield having an annular shape and a first groove formed circumferentially along an inner surface of the heat shield. A support lock may have a second groove extending radially inward from a distal surface of the support lock. A retention ring may be configured to fit within the first groove of the heat shield and the second groove of the support lock.

In various embodiments, the retention ring may be circumferentially discontinuous. The first groove may be disposed at an aft end of the heat shield. An outer surface of the heat shield and an inner surface of the diffuser case may define a first gap. The inner surface of the heat shield and the distal surface of the support lock may define a second gap. An inner diameter surface of the retention ring and a surface of the support lock may define a third gap. An outer diameter surface of the retention ring may contact the heat shield. A first thickness of the heat shield at a forward end may be greater than a distance between the diffuser case and the distal surface of the support lock. The retention ring may be circumferentially discontinuous. The retention ring, the first groove, and the second groove may be configured to retain the heat shield in an axial direction with respect to the diffuser case.

A gas turbine engine is also provided. The gas turbine engine may include a combustor and a diffuser case disposed about the combustor. A heat shield assembly may be disposed between the combustor and diffuser case. The heat shield assembly may include a heat shield having an annular shape and a first groove formed circumferentially along an inner surface of the heat shield. A support lock may have a second groove extending radially inward from a distal surface of the support lock. A retention ring may be configured to fit within the first groove of the heat shield and the second groove of the support lock.

In various embodiments, the inner surface of the heat shield and the distal surface of the support lock may define a gap. A first thickness of the heat shield at a forward end may be greater than a distance between the diffuser case and the distal surface of the support lock. The retention ring may be circumferentially discontinuous.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 3B illustrates a cross-sectional view of a heat shield having an axial retention assembly, in accordance with various embodiments;

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural. Cross hatching lines may be used throughout the figures to denote different parts but not necessarily to denote the same or different materials.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
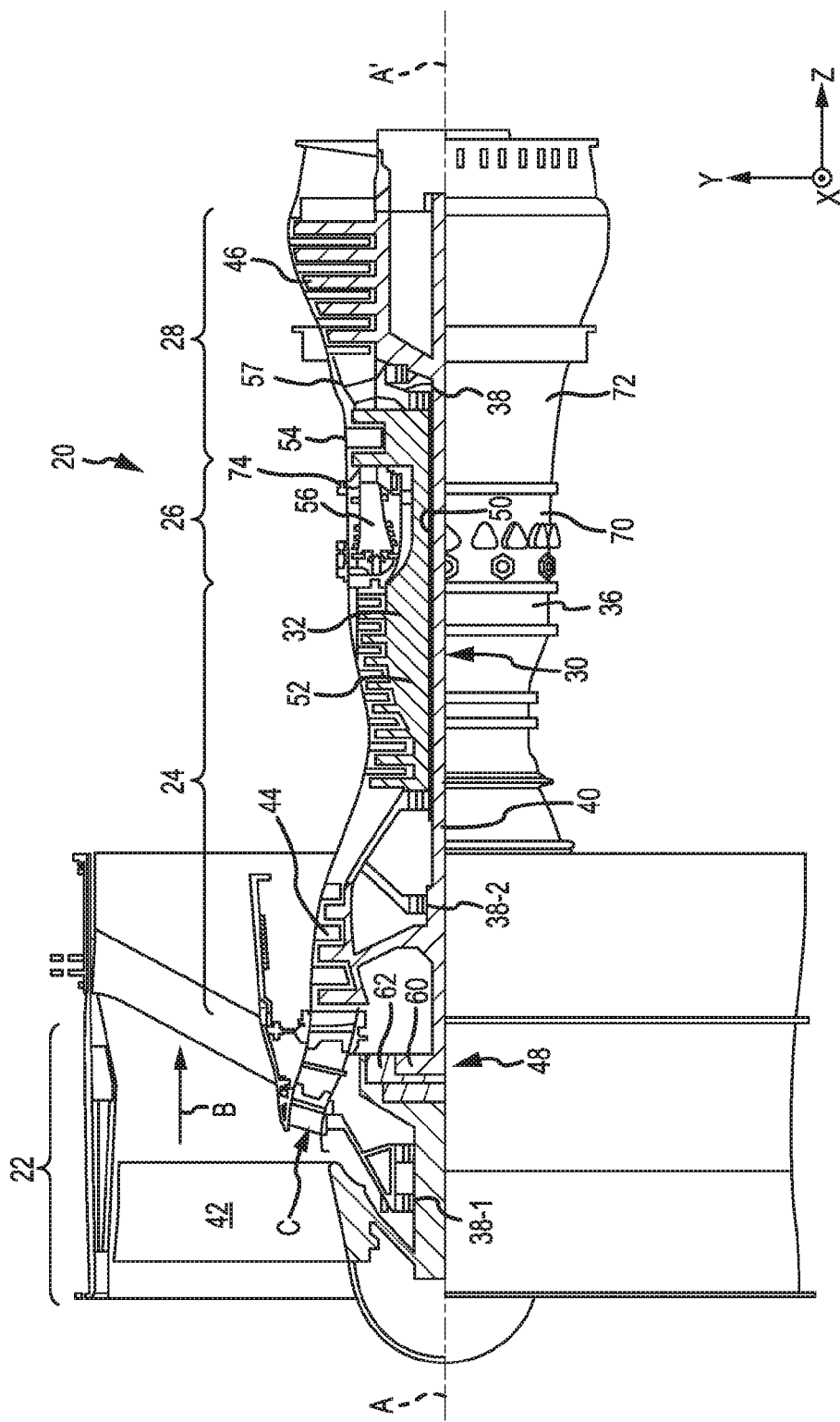
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. An outer diffuser case 70 of engine static structure 36 may enclose the combustor 56. A high pressure turbine (HPT) case 72 of engine static structure 36 may enclose high pressure turbine 54. An aft end of outer diffuser case 70 may be attached to a forward end of HPT case 72 at an attachment interface 74. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans.

Figure 2:
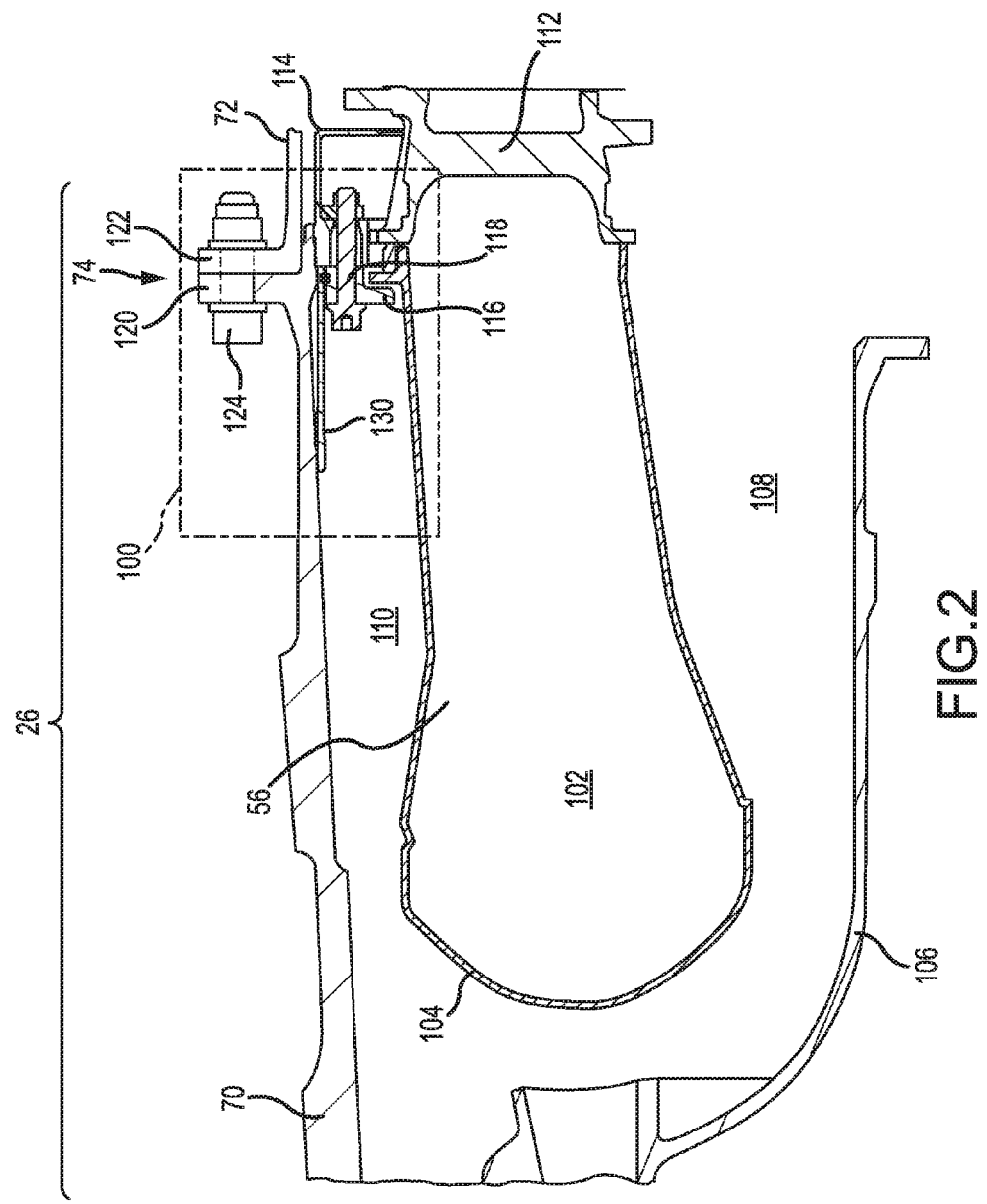
FIG. 2 illustrates a cross-sectional view of a combustor and a case of a gas turbine engine including a heat shield and an axial retention assembly, in accordance with various embodiments.

With reference to FIGS. 1 and 2, a combustor section 26 is shown, in accordance with various embodiments. Combustor section 26 generally includes combustor 56, which may be coupled to outer diffuser case 70 by a diffuser mount assembly 100. Combustor 56 generally includes a combustion chamber 102 defined by a combustor wall 104. Combustor 56 may be encased by outer diffuser case 70 having an annular geometry and disposed about combustor 56. Combustor 56 may be further encased by an inner diffuser case 106. Inner diffuser case 106 is spaced radially inward from combustor wall 104 to define an inner plenum 108. Outer diffuser case 70 is spaced radially outward from combustor wall 104 to define an outer plenum 110.

Combustor 56 may be disposed downstream of the compressor section 24 to receive compressed airflow therefrom. Gas leaving high pressure compressor 52 may flow into combustion chamber 102 to supply combustor 56 with air for combustion. Combustion chamber 102 contains combustion products that flow axially toward turbine section 28. Uncombusted gas may be mixed with fuel and burned in combustion chamber 102. Combusted gas in combustor 56 may reach or exceed temperatures of up to 3,500° F. (1,925° C.) or higher. Heat may radiate from combustor 56 to other nearby components which may cause the nearby components to increase in temperature.

In further reference to FIGS. 1 and 2, turbine section 28 may receive combusted gas or exhaust from combustor section 26. In various embodiments, turbine section 28 may include multiple rows of vanes and multiple rows of blades that can rotate about an axis with respect to the vanes. Combusted gas from the combustor section 26 is channeled to turbine section 28 where it can be directed through the turbine vanes and blades. High pressure turbine 54 may include a plurality of vanes, such as vane 112, and a plurality of blades. Vane 112 may operate as a first stage high pressure turbine vane of high pressure turbine 54. Vane 112 may be coupled to HPT case 72 by a combustor vane support 114. Vane 112 and combustor 56 may further couple to outer diffuser case 70 by combustor vane support 114. Combustor 56 may be secured to outer diffuser case 70 and to combustor vane support 114 by a plurality of support locks 116. In various embodiments, diffuser mount assembly 100 may include a plurality of support locks 116 disposed at regular intervals circumferentially around combustor 56. Each support lock 116 and combustor vane support 114 may be configured to receive a fastener 118. A fastener 118 may be passed through combustor vane support 114 and support lock 116 to mechanically couple support lock 116 to combustor vane support 114. Thus, support lock 116 may secure combustor 56 to combustor vane support 114 and to HPT case 72 and outer diffuser case 70.

In various embodiments, outer diffuser case 70 may be attached to HPT case 72. Outer diffuser case 70 may include a diffuser case flange 120 extending radially from outer diffuser case 70 at an aft end of outer diffuser case 70. HPT case 72 may include an HPT case flange 122 extending radially from HPT case 72 at a forward end of HPT case 72. Diffuser case flange 120 and HPT case flange 122 may mate together at attachment interface 74. Flanges 120, 122 may be in directly abutting engagement with each other at attachment interface 74 and may be secured by a plurality of fasteners 124. Fasteners 124 may be passed through flanges 120, 122 to mechanically couple outer diffuser case 70 and HPT case 72. Fasteners 124 may include rivets, bolts, or other suitable fasteners to couple outer diffuser case 70 and HPT case 72 along flanges 120, 122.

Heat radiating from combustor 56 may introduce thermal loads on outer diffuser case 70 and diffuser case flange 120. For example, heat may convectively transfer from combustor 56 to outer diffuser case 70 and to diffuser case flange 120, resulting in a thermal gradient in diffuser case flange 120. A heat shield 130 may be configured to block heat radiating from combustor 56 from directly impinging on outer diffuser case 70 and on diffuser case flange 120. Heat shield 130 may be disposed between combustor 56 and outer diffuser case 70. In various embodiments, a heat shield 130 may extend circumferentially along an inner wall of outer diffuser case 70. Heat shield 130 may help reduce the thermal gradients in diffuser case flange 120, thereby reducing stress on diffuser case flange 120.

Figure 3A:
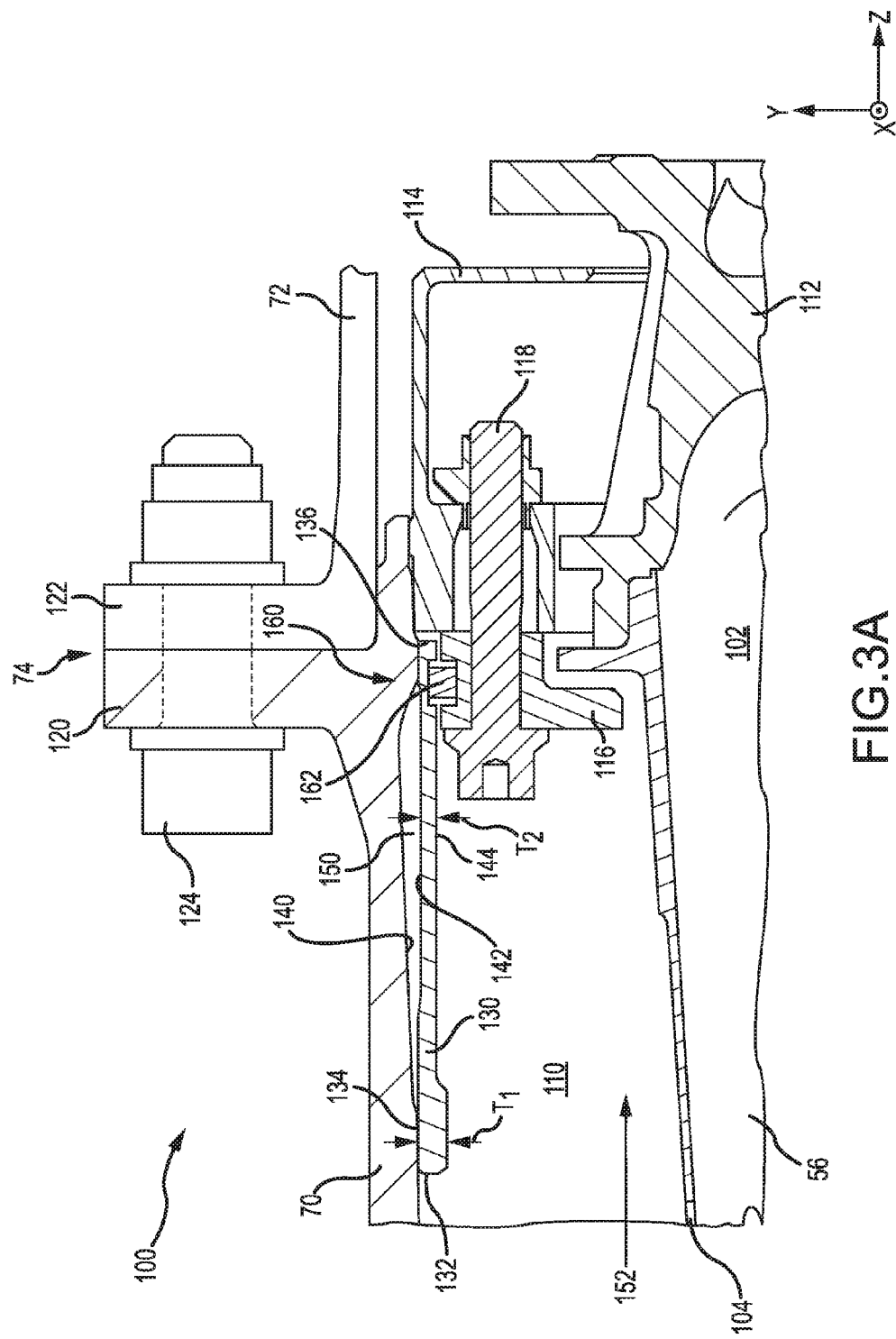
FIG. 3A illustrates a cross-sectional view of a diffuser case flange having a heat shield, in accordance with various embodiments.

With reference to FIG. 3A, a cross-sectional view of diffuser mount assembly 100 is shown with heat shield 130, in accordance with various embodiments. Heat shield 130 may insulate outer diffuser case 70 and diffuser case flange 120 from convective heat transfer from combustor 56 through gas flowing through outer plenum 110. In various embodiments, one end or both ends of heat shield 130, such as a forward end 132 or an aft end 136 of heat shield 130, may contact outer diffuser case 70. FIG. 3A illustrates a forward end 132 of heat shield 130 in contact with outer diffuser case 70 at a contact surface 134. An aft end 136 of heat shield 130 may be disposed at a location of outer diffuser case 70 proximal to diffuser case flange 120. Aft end 136 of heat shield 130 may remain unattached or free-floating with respect to outer diffuser case 70 and combustor vane support 114. During a first engine state, such as an inactive state and/or a "cold" state, aft end 136 of heat shield 130 may not be in direct physical contact with outer diffuser case 70, combustor vane support 114, or support lock 116. During a second engine state, such as an operating state and/or a "hot" state (such as operation at high throttle), the temperature of engine components may increase causing thermal growth of heat shield 130 or other engine components, including support lock 116, fastener 118, retention ring 162, outer diffuser case 70, and/or other components. In various embodiments, a free-floating configuration of aft end 136 of heat shield 130 permits for thermal growth of heat shield 130 or other components, while avoiding damage to heat shield 130. Aft end 136 of heat shield 130 may thermally expand in an axially aft direction toward outer diffuser case 70, while forward end 132 remains snap fit to outer diffuser case 70 at contact surface 134. As thermal growth moves the components closer together, the unattached end of heat shield 130 protects heat shield 130 from damage, by providing tolerance for heat shield 130 to thermally expand. In various embodiments, heat shield 130 may be configured to remain radially spaced apart from support lock 116 and/or outer diffuser case 70 during both a first engine state and a second engine state, i.e., a hot state and a cold state, thereby reducing thermal conduction between support lock 116, heat shield 130, and outer diffuser case 70.

In various embodiments, heat shield 130 may be configured to reduce installation error. The thickness (as measured across a radial distance from outer surface 142 to inner surface 144) of heat shield 130 may be chosen according to various design considerations and may be uniform or may vary along a length (as measured along an axial direction from forward end 132 to aft end 136) of heat shield 130. Forward end 132 of heat shield 130 may be configured with a first thickness $T_1$ which is greater than a second thickness $T_2$ at aft end 136 of heat shield 130 and/or at an area of heat shield 130 aft of forward end 132. The first thickness $T_1$ of heat shield 130 at forward end 132 may be greater than a distance between support lock 116 and outer diffuser case 70. By configuring heat shield 130 with a greater first thickness $T_1$ at forward end 132, forward end 132 is prevented from fitting in the space between support lock 116 and outer diffuser case 70, and thus heat shield 130 is less likely to be installed improperly, such as backwards, i.e. with aft end 136 of heat shield 130 positioned forward of forward end 132.

A portion of heat shield 130, between forward end 132 and aft end 136, may be spaced apart from or separated from outer diffuser case 70 such that an inner surface 140 of outer diffuser case 70 and an outer surface 142 of heat shield 130 define a gap 150. Gap 150 may be disposed between heat shield 130 and outer diffuser case 70. Gap 150 may extend axially and circumferentially along heat shield 130 and between heat shield 130 and outer diffuser case 70. Gap 150 may be configured such that a conductive thermal path is minimized between heat shield 130 and outer diffuser case 70 at gap 150. Gap 150 may be configured to minimize convective heat transfer between heat shield 130 and outer diffuser case 70. Accordingly, heat shield 130 may be configured to minimize convective heat transfer between combustor 56 and outer diffuser case 70, thereby decreasing the temperature of diffuser case flange 120. A lower temperature of diffuser case flange 120 reduces thermal gradients and stress experienced by diffuser case flange 120 and increases the operational life of diffuser case flange 120.

Core airflow C generally flows through combustor section 26 in the direction of arrows 152. During a surge event, core airflow C may backflow or may travel in a direction other than in the direction of arrows 152. Backflow of core airflow C can disrupt the position of engine components and may lead to liberation of heat shield 130 (e.g., heat shield 130 may loosen or detach from outer diffuser case 70), increasing the risk of damage to the surrounding engine structure. Thermal growth of engine components, such as the engine case, may also lead to liberation of heat shield 130. An axial retention assembly 160 may be included to reduce or prevent axial liberation of heat shield 130, due to thermal growth and/or during a surge event. Axial retention assembly 160 may include a retention ring 162 configured to interface with an inner surface 144 of heat shield 130 and a distal portion of support lock 116.

With reference to FIG. 3B, a cross-sectional view of a heat shield assembly 158 is shown with an axial retention assembly 160 for heat shield 130, in accordance with various embodiments. Heat shield 130 and support lock 116 may be configured to receive retention ring 162. An inner surface 144 of heat shield 130 may include a first groove 164 extending circumferentially along inner surface 144. First groove 164 may be a channel formed partially through inner surface 144 of heat shield 130 and may be defined by side walls 166 and surface 168 of heat shield 130. First groove 164 may operate as a first axial retention feature of axial retention assembly 160. A distal surface 170 of support lock 116 may include a second groove 180. Second groove 180 may be a channel formed partially through distal surface 170 of support lock 116 and may be defined by side walls 182 and surface 184 of support lock 116. Second groove 180 may operate as a second axial retention feature of axial retention assembly 160.

In various embodiments, first groove 164 in heat shield 130 and second groove 180 in support lock 116 may be configured to receive a retention ring 162. Retention ring 162 may operate as a third axial retention feature of axial retention assembly 160. In various embodiments, retention ring 162 may fit within first groove 164 of heat shield 130 and within second groove 180 of support lock 116 to reduce movement of heat shield 130 or to prevent heat shield 130 from moving axially in the z direction, thereby forming axial retention assembly 160. Support lock 116 may be secured to combustor vane support 114 by fastener 118, and retention ring 162 may secure heat shield 130 with respect to support lock 116, and thus to combustor vane support 114, with respect to axial motion. Further, combustor vane support 114 may be coupled to outer diffuser case 70. Accordingly, heat shield 130 may be retained with respect to outer diffuser case 70 through retention ring 162, support lock 116, fastener 118, and combustor vane support 114. The configuration of heat shield 130 axially constrained with respect to support lock 116 by retention ring 162 may prevent heat shield 130 from liberating axially in the z direction, for example, with respect to outer diffuser case 70. Thus, axial retention assembly 160 may retain heat shield 130 in the axial direction or reduce movement or liberation of heat shield 130 in the axial direction, or z direction.

In various embodiments, retention ring 162 may be configured to fit within first groove 164 and second groove 180. Retention ring 162 may include an inner diameter surface 190 and an outer diameter surface 192. Retention ring 162 may include a forward surface 194 and an aft surface 196. In various embodiments, retention ring 162 may contact surface 168 of heat shield 130 and/or surface 184 of support lock 116. Retention ring 162 may bias toward an outer diameter or inner diameter, such that retention ring 162 may tend to expand against heat shield 130 or may tend to contract against support lock 116. FIG. 3B shows, as a non-limiting example, retention ring 162 biased or expanded toward an outer diameter with outer diameter surface 192 of retention ring 162 in contact with surface 168 of heat shield 130. Retention ring 162 may be disposed within first groove 164 and second groove 180 such that retention ring 162 may form a tight fit against one of surfaces 168 and 184, while remaining spaced apart from the other of surfaces 168 and 184. FIG. 3B shows, as a non-limiting example, retention ring 162 separated from surface 184 of support lock 116 by a gap 212, with gap 212 being defined by inner diameter surface 190 of retention ring 162 and surface 184 of support lock 116. Gap 212 may extend along one or more surfaces of retention ring 162. Gap 212 may separate retention ring 162 from support lock 116 and be defined by forward surface 194 and aft surface 196 of retention ring 162 and side walls 182 of second groove 180. Gap 212 may further separate retention ring 162 and first groove 164 side walls 166 with gap 212 further defined by forward surface 194 and aft surface 196 of retention ring 162 and side walls 166 of first groove 164. By retention ring 162 being separated from one of support lock 116 and heat shield 130 by gap 212, a conductive thermal path is not formed between support lock 116 and heat shield 130. Gap 212 may be provided at forward surface 194 and aft surface 196 of retention ring 162 to allow thermal growth of retention ring 162, support lock 116, and heat shield 130 while maintaining retention ring 162 within first groove 164 and second groove 180.

In various embodiments, distal surface 170 of support lock 116 and inner surface 144 of heat shield 130 may define a gap 210 between support lock 116 and heat shield 130. Gap 210 may be maintained by a position of retention ring 162, which may be sized and configured to be greater in thickness along the y axis than a combined depth of both first groove 164 and second groove 180, such that retention ring 162 maintains gap 210 when retention ring 162 contacts both surfaces 168 and 184. Support lock 116 remaining spaced apart from heat shield 130 by retention ring 162 provides thermal shielding of outer diffuser case 70 and diffuser case flange 120 (FIG. 3A).

With further reference to FIG. 3B, heat shield 130 may be configured to reduce thermal conduction and thermal convection to outer diffuser case 70, in accordance with various embodiments. Outer surface 142 of heat shield 130 and inner surface 140 of outer diffuser case 70 may define a gap 200 between outer diffuser case 70 and aft end 136 of outer surface 142 of heat shield 130, thereby reducing thermal conduction between heat shield 130 and outer diffuser case 70. Gap 200 at aft end 136 of heat shield 130 permits an amount of fluid flow in and out gap 150 through gap 200 between heat shield 130 and outer diffuser case 70, in order to reduce thermal stress on heat shield 130. Gap 200 may be configured such that heat shield 130 and gap 150 provide shielding from convective heat transfer between outer plenum 110 and outer diffuser case 70.

During engine operation, the temperature of engine components may increase causing thermal growth of the components. In various embodiments as discussed above, aft end 136 of heat shield 130 may thermally grow in an axially aft direction toward outer diffuser case 70. Heat shield assembly 100 may be configured with a gap 204 at aft end 136 of heat shield 130. Gap 204 may be defined by aft end 136 of heat shield 130 and a forward surface 202 of combustor vane support 114. Gap 204 may be configured to allow heat shield 130 to grow axially toward combustor vane support 114 without damaging heat shield 130 or combustor vane support 114. First groove 164 may further be configured to hold retention ring 162 in the event of heat shield 130 thermal growth. Gap 212 between retention ring 162 and side walls 166 of heat shield 130 may permit axial thermal growth of heat shield 130. Thus, axial retention assembly 160 may reduce or prevent axial liberation of heat shield 130, due to thermal growth and/or during a surge event.

Figure 4A:
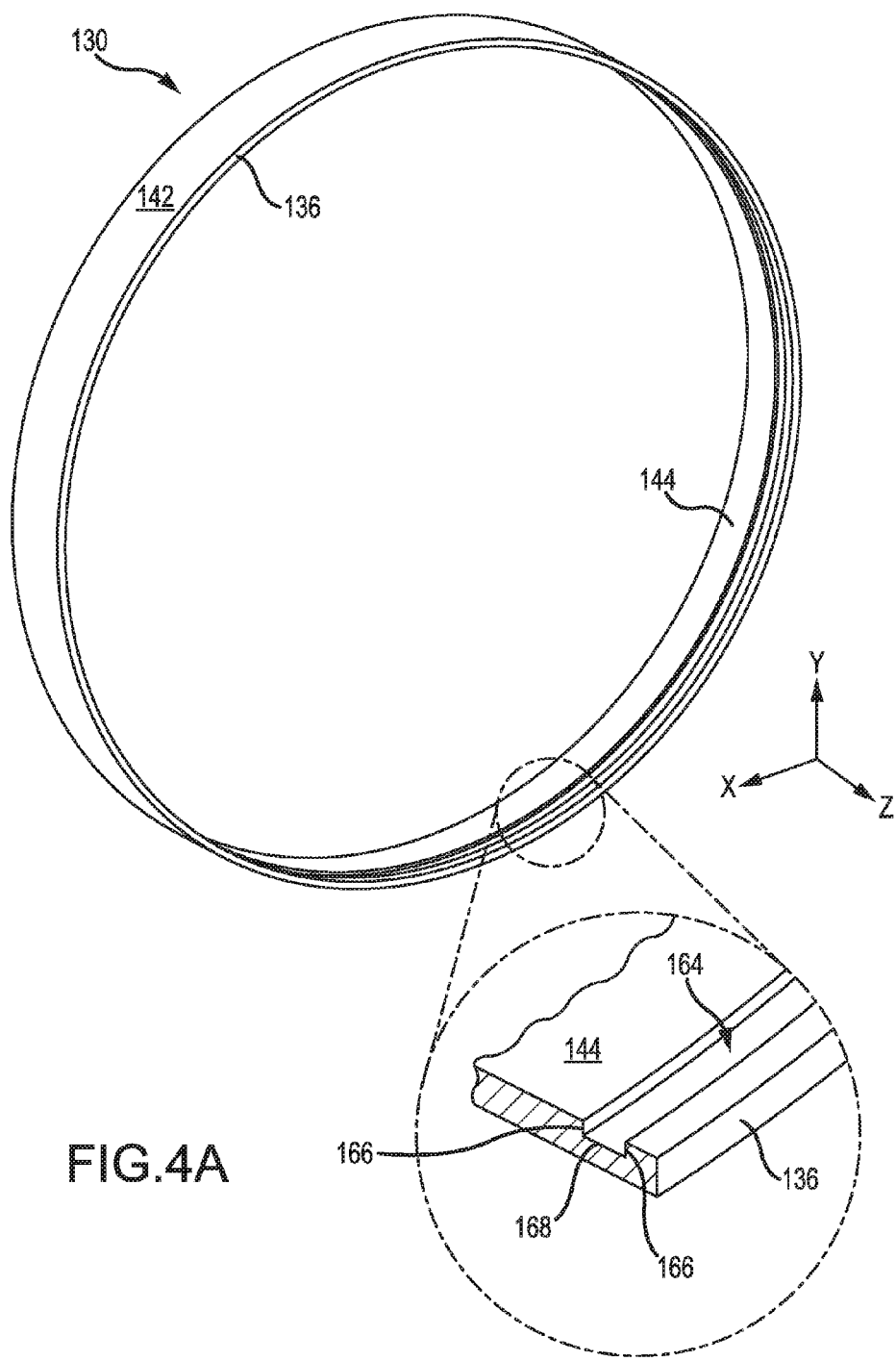
FIG. 4A illustrates a perspective view and a perspective cross-sectional view of a heat shield, in accordance with various embodiments.

With reference to FIG. 4A, a perspective view of heat shield 130 is shown in accordance with various embodiments. In various embodiments, heat shield 130 may be circumferentially continuous (e.g., annular or ring shaped). Heat shield 130 having annular geometry may interface with and fit within outer diffuser case 70, which may also have annular geometry. Heat shield 130 includes an outer surface 142 and an inner surface 144. An inner surface 144 of heat shield 130 may include first groove 164 extending circumferentially along inner surface 144. First groove 164 may extend radially outward from inner surface 144 into heat shield 130 to a depth of up to or greater than 50% of a thickness of heat shield 130. First groove 164 may extend partially through heat shield 130 and may not extend completely through heat shield 130 thereby leaving outer surface 142 of heat shield 130 continuous. First groove 164 may be formed in proximity to aft end 136 of heat shield 130. Heat shield 130 with first groove 164 may be a continuous structure. In various embodiments, heat shield 130 may be manufactured by forging, casting, additive manufacturing, machining or the like. First groove 164 may further be formed by milling, electrochemical machining (ECM), or electrostatic discharge machining (EDM) as desired, for example. It is desirable for the material of heat shield 130 to be resistant to heat. In that regard and in various embodiments, heat shield 130 may include a high performance nickel-based super alloy or other suitable material.

Figure 4B:
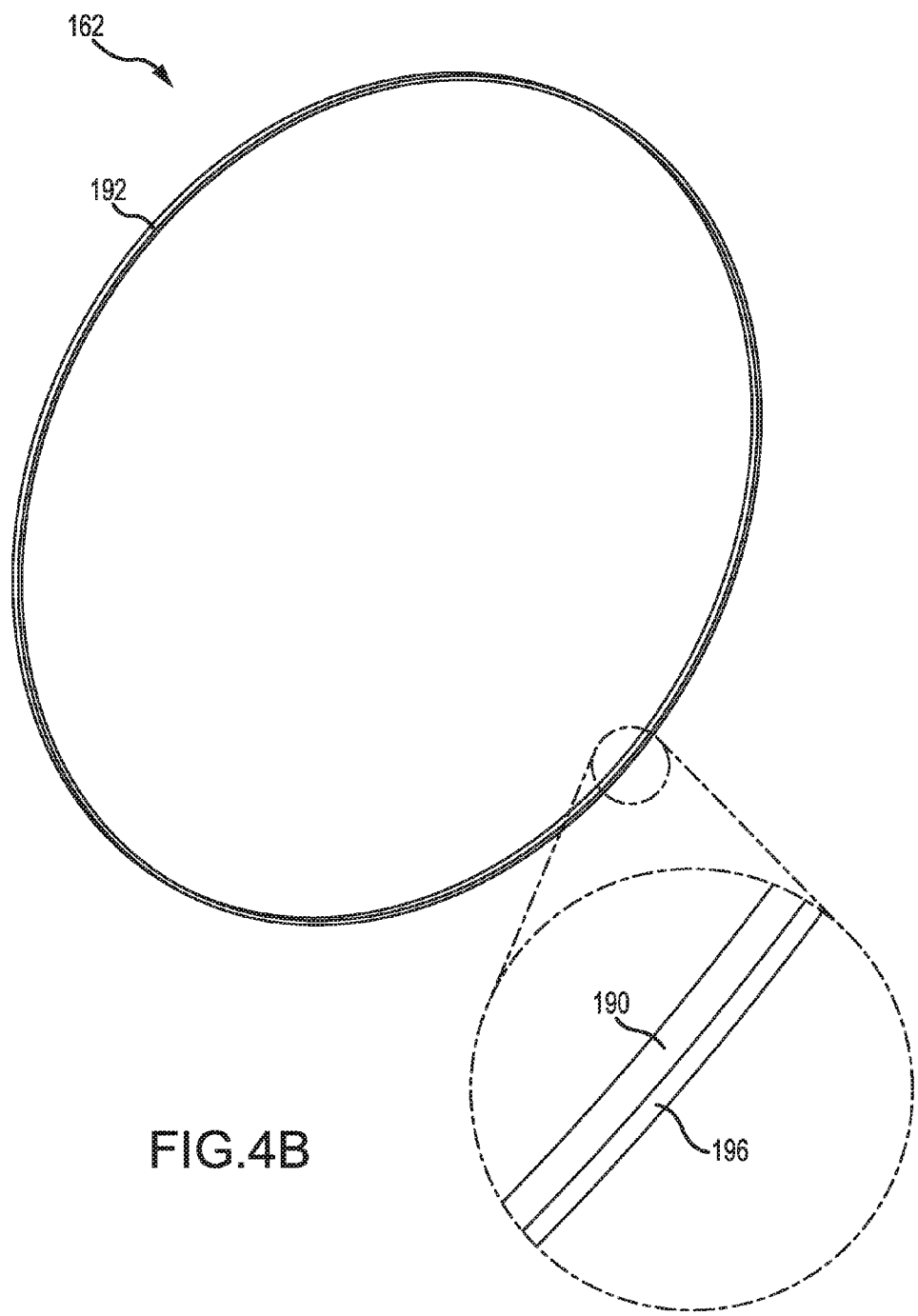
FIG. 4B illustrates a perspective view of a retention ring, in accordance with various embodiments.
Figure 4C:
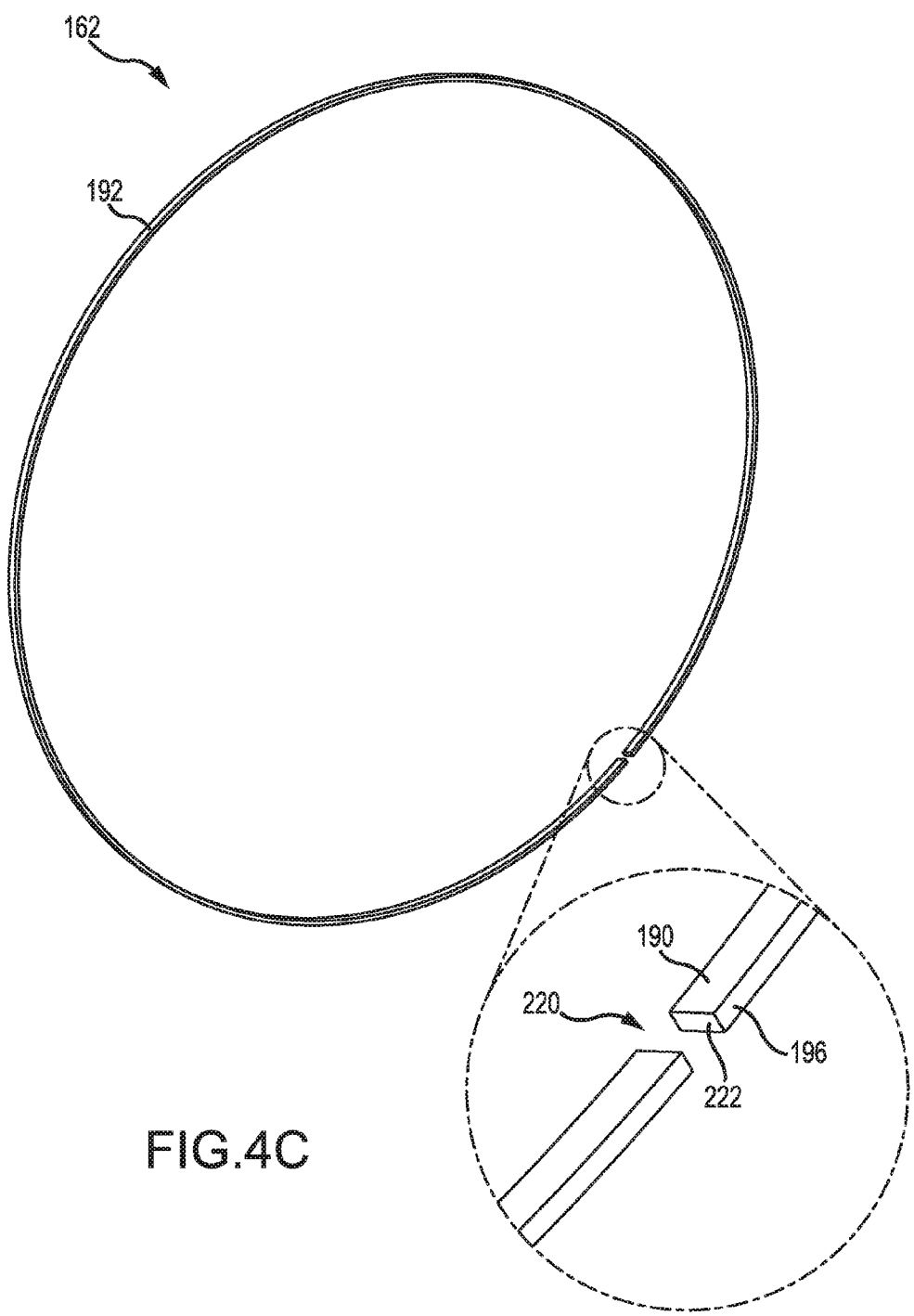
FIG. 4C illustrates a perspective view of a retention ring, in accordance with various embodiments.

With reference to FIGS. 4B and 4C, a perspective view of retention ring 162 is shown in accordance with various embodiments. In various embodiments, retention ring 162 may be annular or ring shaped and may be circumferentially continuous (FIG. 4B) or circumferentially discontinuous (FIG. 4C). Referring to FIG. 4C, retention ring 162 may be a split ring, an expanding ring, an interlocking split ring, or the like. In various embodiments, retention ring 162 may be a discontinuous ring, which is split at an opening 220. Opening 220 may extend radially and completely through retention ring 162 and may be defined by terminal surfaces 222 of retention ring 162. Opening 220 may provide for ease of installation and may provide for a bias or snap fit. Retention ring 162 is depicted with a rectangular cross section, however, it is to be understood that any shape complementary to first groove 164 and second groove 180 may be used (see FIG. 3B).

Figure 5A:
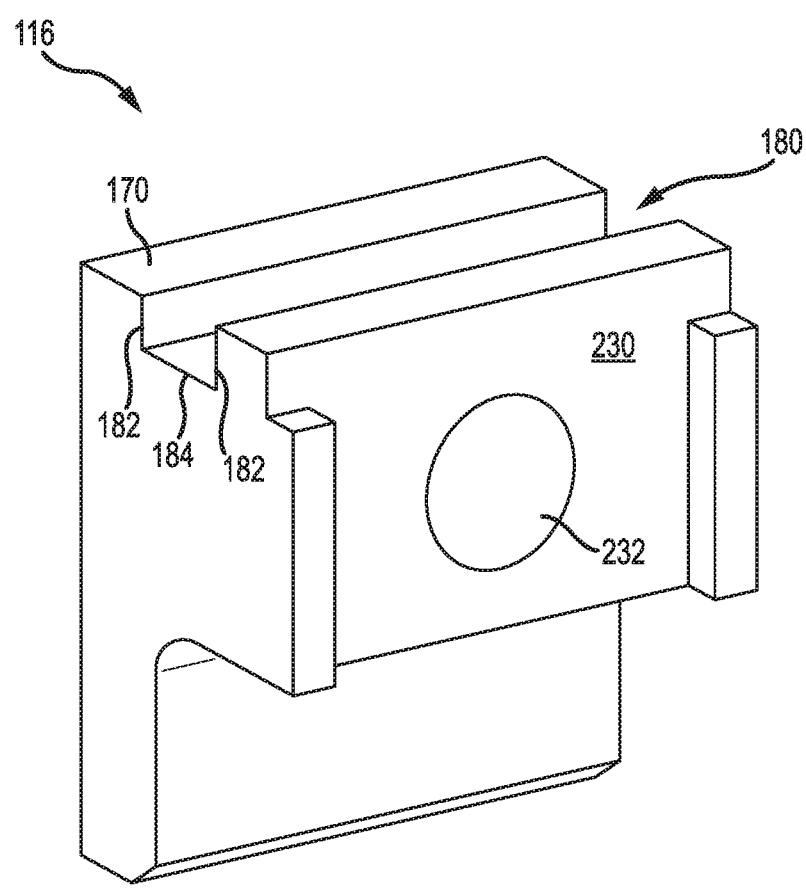
FIG. 5A illustrates a perspective view of a support lock having an axial retention feature, in accordance with various embodiments.

With reference to FIG. 5A and FIG. 3A, a perspective view of support lock 116 is shown with an axial retention feature, in accordance with various embodiments. In various embodiments, support lock 116 may be configured to interface with combustor vane support 114 at a mating surface 230. Support lock 116 may be configured to receive fastener 118, for example, within opening 232. Support lock 116 may be further configured with distal surface 170 having second groove 180 defined by side walls 182 and surface 184. First groove 180 is depicted with a rectangular shape having side walls 182 and surface 184. Side walls 182 may extend radially outward from surface 184. First groove 180 may operate as a first axial retention feature of support lock 116 and may be configured to complement and interface with a third axial retention feature, such as retention ring 162. While first groove 180 of support lock 116 is depicted as rectangular in shape, it is to be understood that any shape complementary to retention ring 162 may be used. In various embodiments, support lock 116 may be manufactured by forging, casting, additive manufacturing, machining such as ECM, EDM, or the like. In various embodiments, support lock 116 may include an austenitic nickel-chromium-based alloy, a high performance nickel-based super alloy, or other suitable material.

Figure 5B:
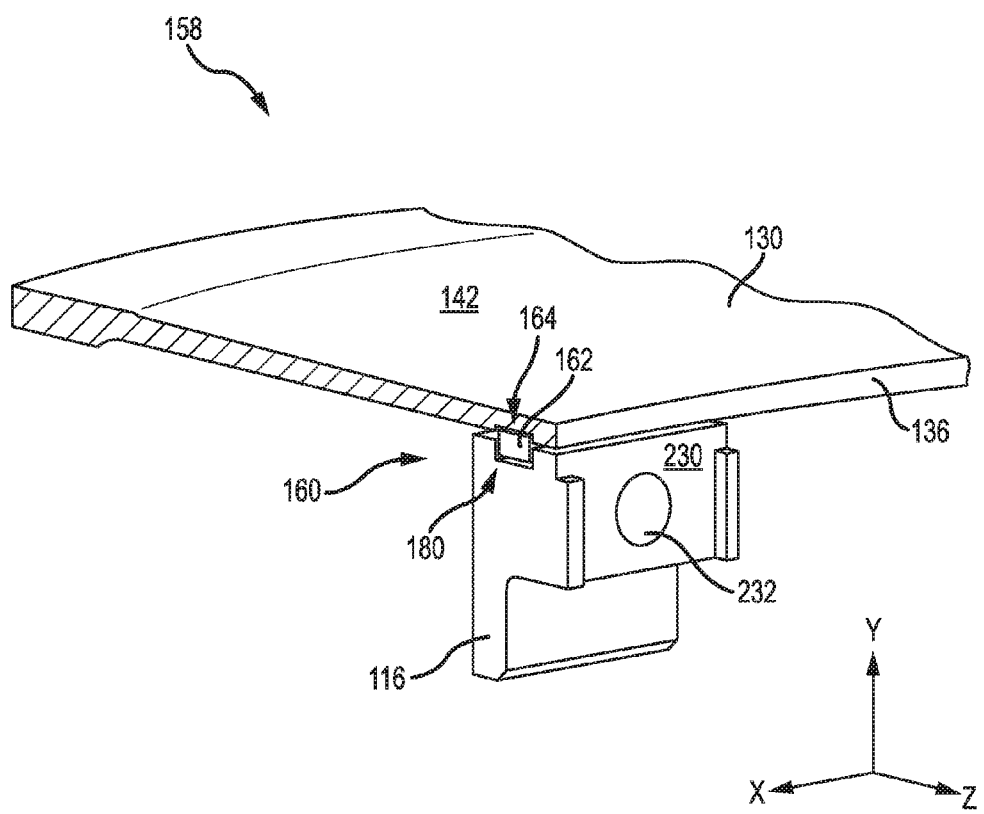
FIG. 5B illustrates a perspective view of a heat shield assembly with an axial retention assembly, in accordance with various embodiments.

With reference to FIG. 5B, a perspective view of a heat shield assembly 158 is shown with axial retention assembly 160, in accordance with various embodiments. In various embodiments, heat shield assembly 158 may include heat shield 130 and an axial retention assembly 160. Axial retention assembly 160 may comprise a plurality of axial retention features, such as retention ring 162, first groove 164 in heat shield 130, and second groove 180 in support lock 116. Retention ring 162 may engage with first groove 164 and second groove 180 to prevent axial liberation of heat shield 130. As a continuous structure, heat shield 130 may provide improved thermal shielding performance.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield assembly for an engine case of a gas turbine engine, comprising:
   a heat shield having an annular shape and a first groove formed circumferentially along an inner surface of the heat shield, the first groove comprising sidewalls, wherein a forward end of the heat shield is configured to contact an inner annular surface of the engine case and an aft end of the heat shield is configured to be proximal to an engine case flange;
   a support lock having a second groove extending radially inward from a distal surface of the support lock; and
   a retention ring configured to fit within the first groove of the heat shield and the second groove of the support lock, the retention ring separated from the sidewalls by a first gap extending an entire height of the sidewalls in a radial direction.

2. The heat shield assembly of claim 1, wherein the retention ring is circumferentially discontinuous.

3. The heat shield assembly of claim 2, wherein the first groove is disposed at the aft end of the heat shield.

4. The heat shield assembly of claim 3, wherein an outer surface of the heat shield and an inner surface of the engine case define a second gap.

5. The heat shield assembly of claim 4, wherein the inner surface of the heat shield and the distal surface of the support lock define a third gap.

6. The heat shield assembly of claim 5, wherein a first thickness of the heat shield at the forward end is greater than a second thickness of the heat shield at the aft end.

7. A combustor section of a gas turbine engine, comprising:
   a diffuser case; and
   a heat shield assembly disposed within the diffuser case, the heat shield assembly comprising:
      a heat shield having an annular shape and a first groove formed circumferentially along an inner surface of the heat shield, the first groove comprising sidewalls, wherein a forward end of the heat shield is in contact with an inner annular surface of the diffuser case and an aft end of the heat shield is proximal to a diffuser case flange,
      a support lock having a second groove extending radially inward from a distal surface of the support lock, and
      a retention ring configured to fit within the first groove of the heat shield and the second groove of the support lock, the retention ring separated from the sidewalls by a first gap extending an entire height of the sidewalls in a radial direction.

8. The combustor section of claim 7, wherein the retention ring is circumferentially discontinuous.

9. The combustor section of claim 8, wherein the first groove is disposed at the aft end of the heat shield.

10. The combustor section of claim 9, wherein an outer surface of the heat shield and an inner surface of the diffuser case define a second gap.

11. The combustor section of claim 10, wherein the inner surface of the heat shield and the distal surface of the support lock define a third gap.

12. The combustor section of claim 7, wherein an outer diameter surface of the retention ring contacts the heat shield.

13. The combustor section of claim 7, wherein a first thickness of the heat shield at the forward end is greater than a distance between the diffuser case and the distal surface of the support lock.

14. The combustor section of claim 7, wherein the retention ring, the first groove, and the second groove are configured to retain the heat shield in an axial direction with respect to the diffuser case.

15. A gas turbine engine, comprising:
   a combustor;
   a diffuser case disposed about the combustor; and
   a heat shield assembly disposed between the combustor and the diffuser case, the heat shield assembly comprising:
      a heat shield having an annular shape and a first groove formed circumferentially along an inner surface of the heat shield, the first groove comprising sidewalls, wherein a forward end of the heat shield is in contact with an inner annular surface of the diffuser case and an aft end of the heat shield is proximal to a diffuser case flange,
      a support lock having a second groove extending radially inward from a distal surface of the support lock, and a retention ring configured to fit within the first groove of the heat shield and the second groove of the support lock, the retention ring separated from the sidewalls by a first gap extending an entire height of the sidewalls in a radial direction.

16. The gas turbine engine of claim 15, wherein the inner surface of the heat shield and the distal surface of the support lock define a third gap.

17. The gas turbine engine of claim 16, wherein a first thickness of the heat shield at the forward end is greater than a distance between the diffuser case and the distal surface of the support lock.

18. The gas turbine engine of claim 17, wherein the retention ring is circumferentially discontinuous.

* * * * *